United States Patent
Höglund et al.

(10) Patent No.: US 9,528,775 B2
(45) Date of Patent: Dec. 27, 2016

(54) CLAMPING DEVICE FOR FLOW MODULE PLATES, REACTOR PLATES OR HEAT EXCHANGER PLATES

(71) Applicant: ALFA LAVAL CORPORATE AB, Lund (SE)

(72) Inventors: Kasper Höglund, Rönninge (SE); Tommy Norén, Veberöd (SE); Magnus Lingvall, Huddinge (SE)

(73) Assignee: Alfa Laval Corporate AB, Lund (SE)

(*) Notice: Subject to any disclaimer, the term of this patent is extended or adjusted under 35 U.S.C. 154(b) by 0 days.

(21) Appl. No.: 14/640,920

(22) Filed: Mar. 6, 2015

(65) Prior Publication Data

US 2015/0176923 A1 Jun. 25, 2015

Related U.S. Application Data

(63) Continuation of application No. 12/516,224, filed as application No. PCT/SE2007/000104 on Nov. 26, 2007, now Pat. No. 9,182,180.

(30) Foreign Application Priority Data

Nov. 27, 2006 (SE) ...................................... 0602541

(51) Int. Cl.
| | |
|---|---|
| *B25B 1/10* | (2006.01) |
| *F28F 3/08* | (2006.01) |
| *F28F 27/00* | (2006.01) |

(52) U.S. Cl.
CPC ............... *F28F 3/08* (2013.01); *F28F 3/083* (2013.01); *F28F 27/00* (2013.01); *B01J 2219/2493* (2013.01); *B01J 2219/2495* (2013.01)

(58) Field of Classification Search
CPC .......... B23Q 1/035; B25B 1/2405; B25B 11/02
See application file for complete search history.

(56) References Cited

U.S. PATENT DOCUMENTS

| 1,972,379 A | 9/1934 | Feldmeier |
| 2,015,819 A | 10/1935 | Seligman et al. |
| | (Continued) | |

FOREIGN PATENT DOCUMENTS

| EP | 0043113 A2 | 1/1982 |
| JP | 49-024026 B | 6/1974 |
| | (Continued) | |

OTHER PUBLICATIONS

PCT International Search Report for corresponding PCT Application No. PCT/SE2007/001042 dated Mar. 5, 2008.
(Continued)

*Primary Examiner* — Lee D Wilson
(74) *Attorney, Agent, or Firm* — MKG, LLC

(57) ABSTRACT

A clamping device includes two end plates, disc springs, a grid of pistons, and tension rods. Each of the two end plates defines a plate area located within a perimeter thereof. The clamping device has piles of disc springs arranged as a grid of springs threaded on respective ones of the grid of pistons. The piles of disc springs is distributed and supported over the plate area on one of the two end plates. The grid of springs is positioned inwardly from the tension rods. The grid of springs is positioned to distribute clamping forces on one or more flow module plates, on one or more reactor plates, on one or more heat exchanger plates or on combinations of one or more flow module plates, one or more reactor plates, or on one or more heat exchanger plates, which plates are placed between the two end plates.

11 Claims, 11 Drawing Sheets

(56) References Cited

U.S. PATENT DOCUMENTS

| | | | |
|---|---|---|---|
| 2,221,937 A | 11/1940 | Astle | |
| 2,405,256 A | 8/1946 | Jack et al. | |
| 2,582,871 A | 1/1952 | Kintner | |
| 2,677,531 A | 5/1954 | Hock, Sr. et al. | |
| 4,200,272 A * | 4/1980 | Godding | B23Q 1/035 269/26 |
| 4,572,564 A * | 2/1986 | Cipolla | B25B 1/2421 269/266 |
| 4,584,751 A | 4/1986 | Gray et al. | |
| 4,776,387 A | 10/1988 | Newman | |
| 4,901,414 A | 2/1990 | Breda et al. | |
| 5,462,112 A | 10/1995 | Johansson | |
| 5,484,666 A | 1/1996 | Gibb et al. | |
| 6,206,354 B1 * | 3/2001 | Lin | B25B 1/103 269/136 |
| 7,189,468 B2 | 3/2007 | Izenson et al. | |
| 8,161,997 B2 | 4/2012 | Hoglund et al. | |
| 9,182,180 B2 * | 11/2015 | Hoglund | F28F 3/083 |
| 2003/0116305 A1 | 6/2003 | Beddome et al. | |
| 2004/0188060 A1 | 9/2004 | Finch et al. | |
| 2004/0224213 A1 | 11/2004 | Dristy | |
| 2015/0176923 A1 * | 6/2015 | Hoglund | F28F 27/00 165/67 |

FOREIGN PATENT DOCUMENTS

| | | | |
|---|---|---|---|
| JP | 64-000220 Y2 | 1/1989 | |
| JP | 09-127527 A | 5/1997 | |
| JP | 10-138660 A | 5/1998 | |
| JP | 2000193033 A | 7/2000 | |
| JP | 2001-276943 A | 10/2001 | |
| JP | 2002004811 A | 1/2002 | |
| JP | 2002164066 A | 6/2002 | |
| JP | 2003322186 A | 11/2003 | |
| JP | 2005-131763 A | 5/2005 | |
| JP | 2005246472 A | 9/2005 | |
| JP | 2005268125 A | 9/2005 | |
| JP | 2006310900 A | 11/2006 | |
| JP | 2008-036650 A | 2/2008 | |
| JP | 2008145837 A | 6/2008 | |
| WO | 9510746 | 4/1995 | |
| WO | 2006008075 A1 | 1/2006 | |

OTHER PUBLICATIONS

PCT International Search Report for corresponding PCT Application No. PCT/SE/2009/050485 dated Sep. 18, 2009.

Notice of Inquiry from corresponding Japanese Application No. 2011-510460, dated Oct. 29, 2013.

Office Action in corresponding Taiwan Patent Application No. 098114950 dated May 10, 2013.

* cited by examiner

SECTION A-A

CLAMPING DEVICE FOR FLOW MODULE PLATES, REACTOR PLATES OR HEAT EXCHANGER PLATES

CROSS REFERENCE TO RELATED APPLICATIONS

This application is a continuation application and claims priority benefit of commonly owned and co-pending U.S. patent application Ser. No. 12/516,224, filed Jun. 17, 2009, which issued as U.S. Pat. No. 9,182,180 B2 on Nov. 10, 2015 and which is a national stage application of PCT Application No. PCT/SE2007/000104, filed Nov. 26, 2007 and which claims priority to Swedish Patent Application No. SE 0602541-5, filed Nov. 27, 2006, which are hereby incorporated by reference in their entirety.

FIELD OF THE INVENTION

The present invention relates to a clamping device, a method for opening and closing a plate reactor or a flow module, and uses of the clamping device.

BACKGROUND

Flow modules or reactors, which comprise plates stacked together and with plates manufactured in materials having large temperature expansion coefficient and low modulus of elasticity, operate over a wide temperature range. The large temperature expansion coefficient and low modulus of elasticity of the materials of the plates, compared to framework, screws, tension rods and end plates etc. can cause damages or leakage. Thus, one problem is to keep the tension over the whole construction within limits over the whole temperature range without causing leakage or damage on any of the parts in the module or reactor.

Another problem that occurs when working with plates is to distribute contact pressure as equal as possible over the plates to prevent unevenness and thus leakage or damaging any of the stacked plates.

SUMMARY

Accordingly, the present invention is directed in one aspect placing a stack of plates on a grid of springs, which is placed between two end plates. The tension rods can then be kept tensioned within acceptable limits. Another advantage is that the clamping forces get evenly distributed over the whole plate area of the stacked plates instead of being localised along the edges of the plates. Yet another advantage is that the bending stiffness of the end plate gets less important in the flow module or the plate reactor. A further advantage is that by measuring the compression of the springs it is possible to monitor and control the clamping forces. Another advantage is that the force can be indirect measured by measuring the deflection of each spring.

A further advantage is that by selecting a spring rate, which is significantly lower than the stiffness of the surrounding structure, the clamping force distribution will remain valid independently of the load distribution on the surrounding structural components. Another advantage is that it is possible to have different forces in each spring if desired.

To make the flow module or the reactor seals work properly, the clamping forces has to be within a proper range. The spring force F is a function of the spring length L. The spring length will vary within the range from $L_{max}$ to $L_{min}$, where $L_{max}$ is defined as the free length of an unloaded spring, and $L_{min}$ is defined as spring length at maximum compression. The maximum force $F_{max}$ is defined as the spring force at maximum compression of the spring, and the spring force will therefore vary between 0 and $F_{max}$. The spring force $F_x$, which corresponds to $L_x$, has to be larger than force $F_1$ to make sure that no leakage will occur but the spring force should not be bigger than force $F_2$ to not risk permanent deformations. $F_1$ and $F_2$ correspond to spring lengths $L_1$ and $L_2$, respectively, and $L_1 < L_x < L_2$. By using springs or piles of springs, with an adequate force compression curve, a sufficient working range $L_2$ to $L_1$ can be achieved. The range $L_2$ to $L_1$ must be bigger than other geometric discrepancies from manufacturing, assembly and operation. Such discrepancies can for example be manufacturing tolerances on flatness and thickness, or deformations originating from forces at assembly, or dimensional changes due to thermal expansion or material creep at operation.

The present invention further relates to a clamping device comprising two end plates, springs, and tension rods, wherein the springs are arranged on a supporting element to distribute clamping forces on one or more flow module plates, one or more reactor plates, one or more heat exchanger plates, or combinations thereof, which plates are placed between the two end plates. The tension rods together with the end plates are forming a frame for the reactor plates or the flow module plates.

In one embodiment, the spring arrangement, i.e. a grid of spring piles distributes the spring force on a stack of plates of a flow module or of a plate reactor. The flow module or the plate reactor includes one or more layers of plates stacked together. The plates can be reactor plates, flow plates, heat exchanger plates, intermediate plates etc. wherein the plates can have inserted elements or integrated elements with flow channels, Peltier element, plates with depressions, channels or grooves, elements with cut through area or cut through channels. The plates can also be barrier plates, insulating plates, combinations of plates either integrated or separate.

Two or more tension rods may be arranged along the periphery of the plates. The tension rods may be screwed or tightened together to compress the springs to length $L_x$, which is $L_x > L_{min}$ and $L_x < L_{max}$. The tightening of the arrangement may be accomplished manually or by aid of an actuator depending on the arrangement. The tension rods may be tightened synchronously or consecutively in small steps according to a tightening scheme. The tension rods may have a fixed length or may have a modular length to set several predefined fixed lengths. The predefined length may correspond to one plate, two plates up to any desired length. The modular length may be achieved by combining one or more of the predefined length tension rods. The fixed length at least defines a thickness of one plate or defines a total thickness of several plates. According to another alternative the tension rods may be mechanical jacks or roller screws.

The spring arrangement, i.e. a grid of spring piles, can suitably be integrated in an end plate. The springs may be arranged into holes in the end plate or arranged to the end plates by pistons going through the end plate. The springs may be any type of suitable springs. One type of springs suitable is a pile of disc springs, in which the pile of discs is arranged to receive the most favourable spring force $F_x$.

The present invention further relates to a method for opening or closing a flow module or a plate reactor comprising the following steps: step (i) compressing an arrangement of springs to a length $L_x > L_{min}$; step (ii) placing a stack of one or more flow module plates, one or more reactor plates, one or more heat exchanger plates, or combinations thereof between the compressed arrangement of springs and an end plate; step (iii) tightening the tension rods and connecting the two endplates, to a length A defined as the total length between two end plates predefined by the length of the tension rods; and step (iv) releasing the compression of the arrangement of the springs.

An alternative method for opening or closing a flow module or a plate reactor comprises step (i) placing a stack of one or more flow module plates, one or more reactor plates, one or more heat exchanger plates, or combinations thereof between the non-compressed arrangement of springs and an end plate; step (ii) compressing an arrangement of springs to a length $L_x > L_{min}$; step (iii) placing distance blocks between one end plate and a distribution plate in a frame to set the distance A; and step (iv) releasing the compression of the arrangement of the springs.

The method according to both alternatives may also comprise a step (v) in which length $L_x$ is measured for each spring for control of spring force $F_x$.

The method may also comprise that the compressing in step (i) and the release of the compression in step (iv) are aided by hydraulic cylinders or by an electro-mechanical or mechanical actuator.

According to a further alternative the method for opening a flow module or a plate reactor includes the following steps: step (i) compressing an arrangement of springs in a clamping device according to the invention. The arrangement of springs are compressed to a length $L_x > L_{min}$ or to a length that one or more flow module plates, one or more reactor plates, one or more heat exchanger plates, or combinations thereof can be removed; step (ii) removing one or more flow module plates, one or more reactor plates, one or more heat exchanger plates, or combinations thereof; and step (iii) releasing the compression of the arrangement of the springs.

According to a further alternative comprises the method for opening of a flow module or of a plate reactor comprising the following steps: step (i) compressing an arrangement of springs to a length $L_x > L_{min}$; step (ii) displacing distance blocks from between one end plate and a distribution plate in a frame; step (iii) releasing the compression of the arrangement of the springs; and step (iv) removing one or more flow module plates, one or more reactor plates, one or more heat exchanger plates, or combinations thereof, from the frame.

According to an alternative of the method the tension rods may be tightened simultaneously and synchronously until the correct length $L_x$ is set. This could be done by using mechanic jacks or roller screws as tension rods with an actuator. When the correct $L_x$ is reached must the mechanic jacks or the roller screws and nuts be locked. The actuator may be an electric motor, a hydraulic motor or any other type of motor. The synchronisation may be done by aid of a mechanical transmission or by controlling individual actuators.

The present invention relates also to the use of a clamping device to compensate for temperature expansion of a stack of one or more flow module plates, one or more reactor plates, one or more heat exchanger plates, or combinations thereof between two end plates. The present invention relates further to a use of a clamping device for opening or closing of a flow module or of a plate reactor.

When there is an increase of pressure within the flow module or the plate reactor any kind of pressure sensor sends a signal to a control unit according to one alternative of the invention. The control unit may be connected to an actuator of hydraulics, cylinders, mechanic jacks, or roller screws, which hydraulics are connected to the clamping device. When the pressure reaches a critical level or a predefined value the control unit forces the actuator to open the flow module or the plate reactor to release the pressure.

In the following the invention will be explained by the use of FIGS. 1 to 12. The figures are for the purpose of demonstrating the invention and are not intended to limit its scope.

DETAILED DESCRIPTION OF THE FIGURES

Figure 1:
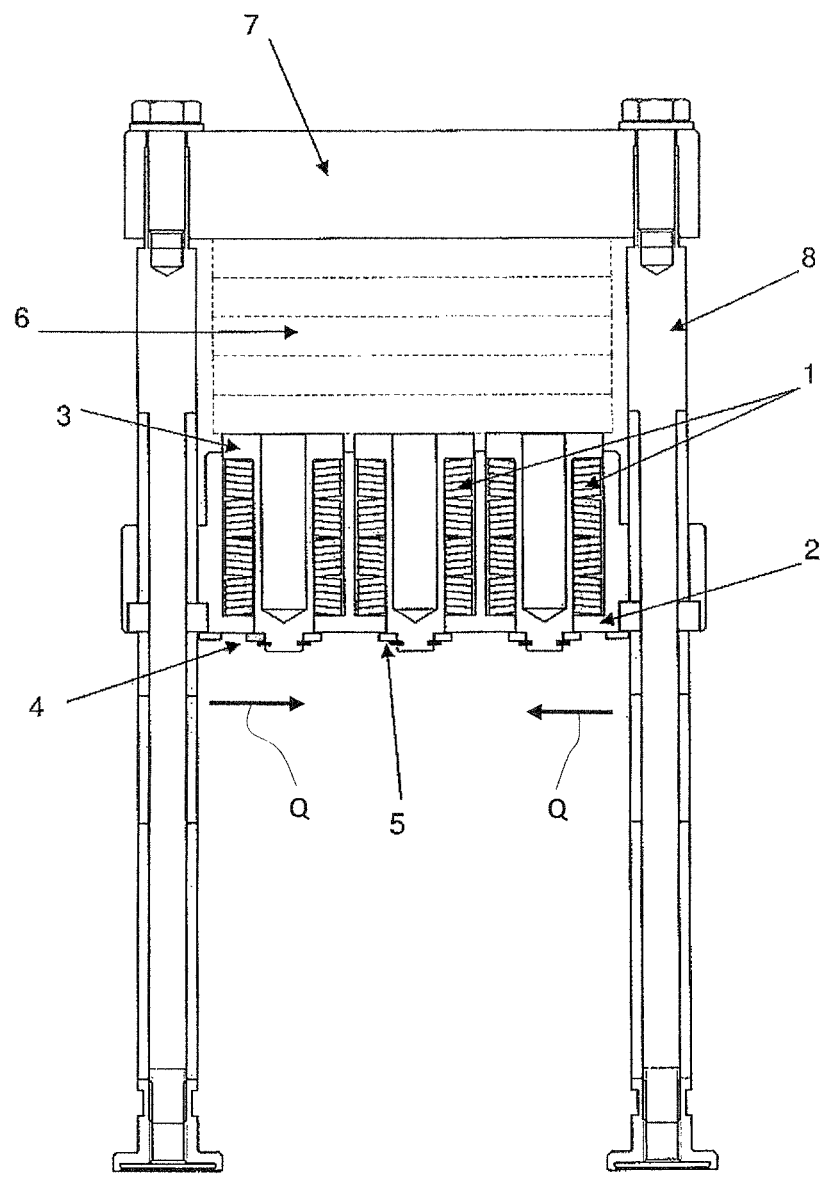
FIG. 1 shows a cross view over a grid of springs supported on an end plate according to one alternative of the invention.

In one embodiment, FIG. 1 is a cross view over a grid of springs 1 supported on an end plate 2. In this figure the springs are piles of disc springs arranged to get the adequate length and force to be able to seal the reactor or flow module. Each pile of disc springs are positioned on a piston 3, which extends through a hole in the end plate 2 and is locked on the opposite side (i.e., an outwardly facing side) of the end plate 2 with a washer 4 and a retaining ring 5. The washer 4 and the retaining ring 5 are positioned on a portion of the piston 3 that extends through the hole to an outwardly facing side of the end plate 2. Thus, the washer 4 and the retaining ring 5 are located outwardly from the outwardly facing side of the end plate 2. Reactor plates 6 or flow plates 6 are tightly sealed by the aid of an end plate 7 and tension rods 8. The tension rods may have a fixed length or may be modular, to set several, predefined fixed lengths, which could correspond to the length of one, two or more plates, and each modular tension rod may be composed of the different combinations to be as flexible as possible, thus one set of modular tension rods may be used for a single plate or for more than one plates or for several plates depending on how the modular tension rods are arranged for the specific application. According to this embodiment closing the plate reactor or the flow module is achieved by screwing together the two end plates with the grid of springs, the plates and the tension rods. When the equipment is closed or sealed the clamping force may be measured by measuring the distance between the end plate and the ends of the spring pistons.

Figure 2:
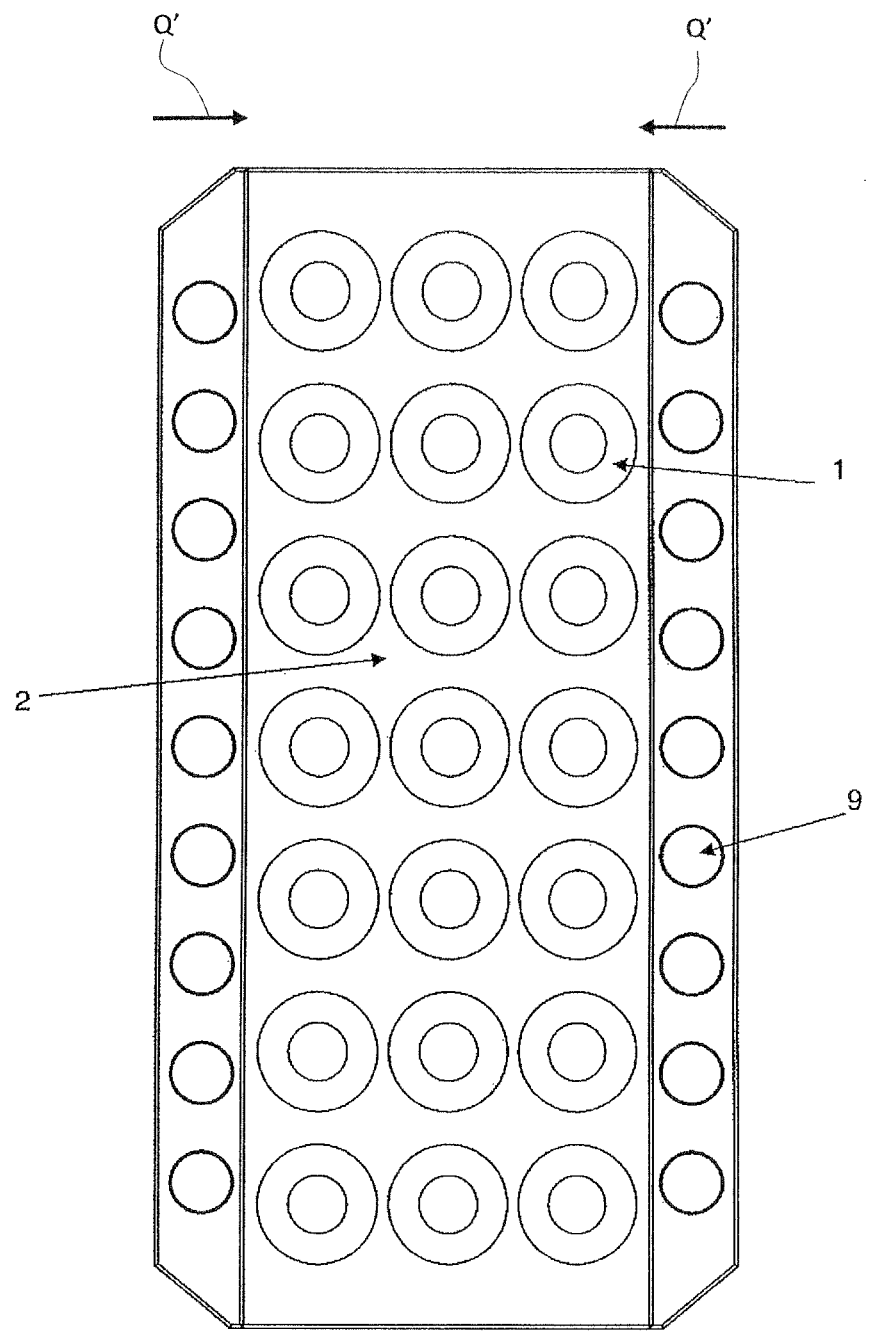
FIG. 2 shows a top view of a grid of springs according to one alternative of the invention.

FIG. 2 is a top view of a grid of springs according to one embodiment of the invention. In this figure piles of disc springs 1 form a 3×7 grid of springs on an end plate 2. Along the long sides of the end plate are holes 9 for fixing the tension rods 8 to screws, which are not seen in this figure, when closing the assembly. Each of the tension rods 8 extend through a respective one of the holes 9 in the end plate 2. The piles of disc springs 1 are over an area defined by the end plate 2. The grid of springs (formed by the piles of disc springs 1) is positioned inwardly in the direction of the arrows Q, from the tensions rods 8 as shown best in FIG. 1. As shown in FIG. 2 the grid of springs (formed by the piles of disc springs 1) is positioned inwardly from the holes 9, in the direction indicated by the arrows Q'. The tension rods are configured in a first row of tension rods having two or more of the tension rods therein and a second row of tension rods having two or more of the tension rods therein. The grid of springs and the grid of pistons are positioned between the first row of tension rods and the second row of tension rods. One way of closing the assembly is to apply a grid of spring piles distributed over the plate, as shown in FIG. 2, where everything is screwed together by tension rods along the perimeter of the plates. The rods are tightened evenly until the deflection of each spring pile is correct.

Figure 3:
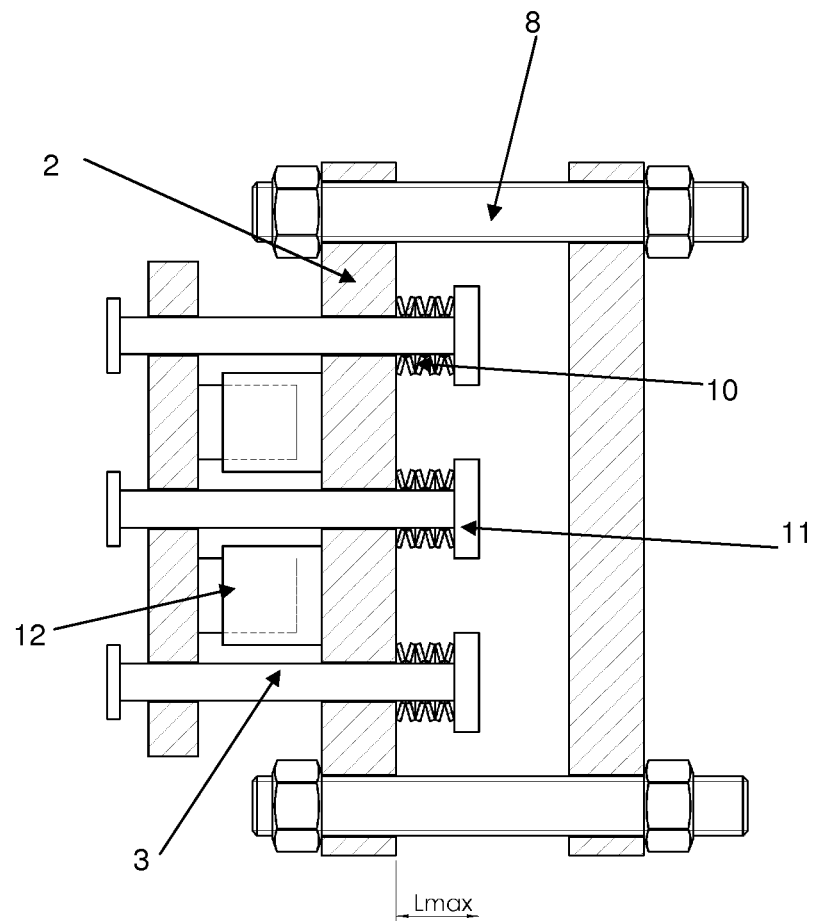
FIG. 3 shows a side view of a non-compressed grid of springs having length $L_{max}$.
Figure 4:
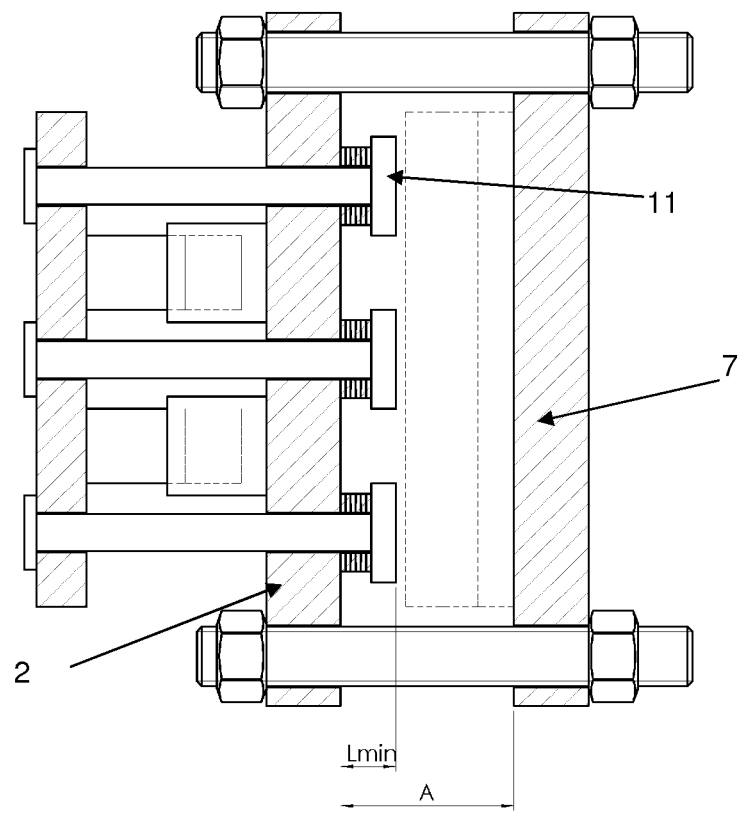
FIG. 4 shows a side view of a compressed grid of springs having length $L_{min}$, the figure is also defining length A.
Figure 5:
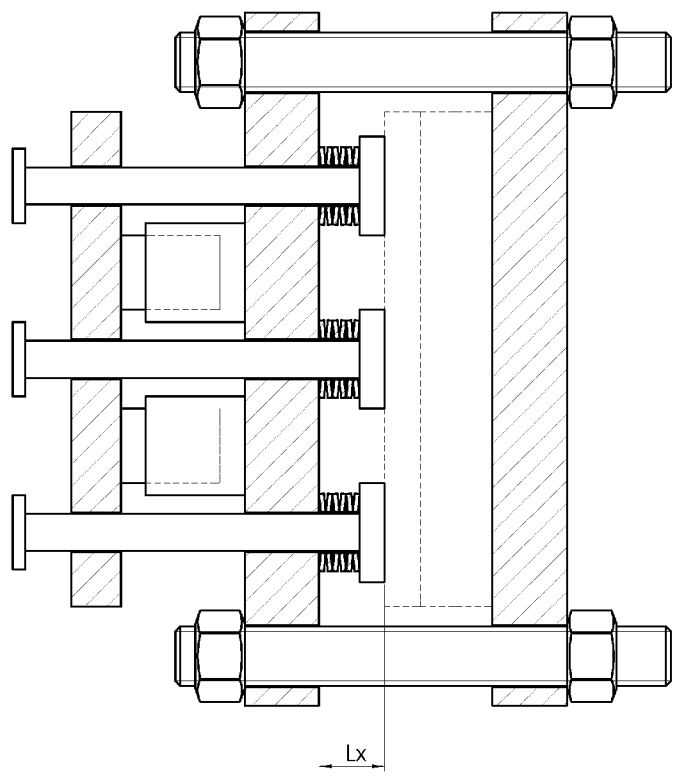
FIG. 5 shows a side view of a grid of springs having length $L_x$ and how the springs are creating a seal of the flow module or the plate reactor.

In FIG. 3 a non-compressed grid of springs 10 having length $L_{max}$ is shown, and the springs are positioned on pistons 3. In this figure a constant is added to the length of the springs, the constant is equal to the thickness of the heads 11 of the pistons 3. The figure also shows hydraulic cylinders 12, which can be used for closing and opening the reactor or the flow module. When the flow module or the reactor is open the springs are compressed by hydraulic cylinders to a length $L_{min}$, which can be seen in FIG. 4. Length $L_{min}$ in this figure is the same constant as in FIG. 3. Flow plates, reactor plates, heat exchanger plates, or combinations thereof are placed between the heads 11 and the end plate 7, and the plates are put into place and the nuts are tightened until the clamping length is A. Clamping length A is defined as the total length between the two endplates 2 and 7. In FIG. 5 it can bee seen how the flow module or the reactor is closed. When the hydraulics is released then the plates are clamped. To control the forces $F_x$ length $L_x$ are measured for each spring pile. The length of the springs is $L_x$ plus the same constant as in FIG. 3. Length $L_x$ correspond to spring force $F_x$, which is acting on the flow module or the reactor. Length $L_x$ is changing depending on the temperature. The large temperature expansion coefficient and low modulus of elasticity of the materials of the plates, compared to framework, screws, tension-rods and end plates etc. is thus compensated for by the grid of springs which gives the assembled reactor or flow module a flexibility and damages or leakage can be prevented.

Figure 6:
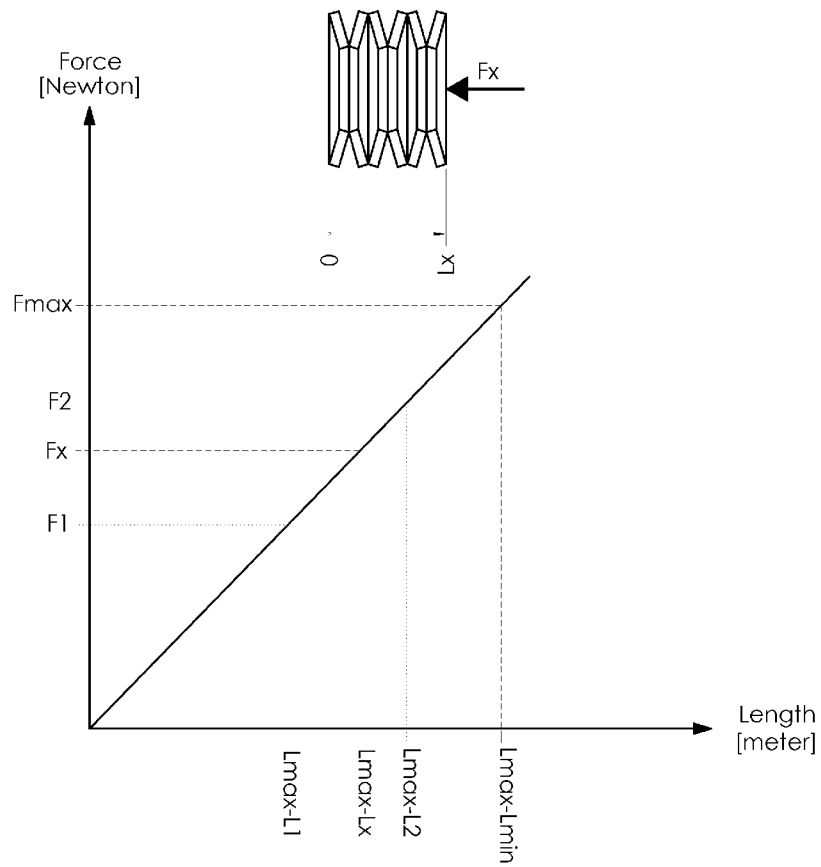
FIG. 6 shows a diagram of the function between spring force and length of the springs.

FIG. 6 shows a diagram of the function between spring force and length of the springs. By measuring the spring lengths of the grid of springs it is possible to approximate the force for each length by use of the diagram.

The diagram of FIG. 6 is exemplified in Example 1, which example is for the purpose of illustrating the function between force and spring length, and is not for limiting the scope of invention.

Figure 7:
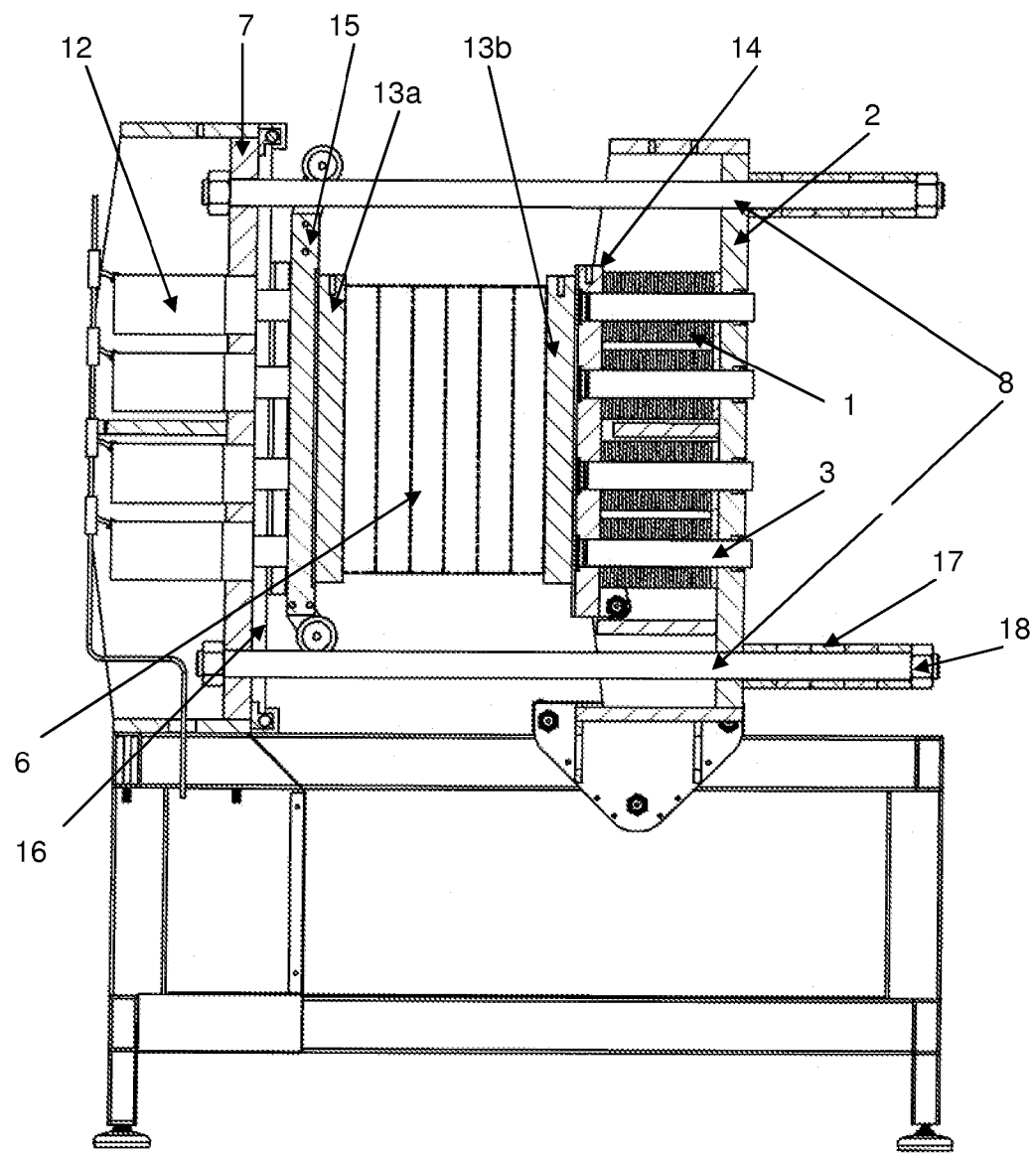
FIG. 7 shows an alternative embodiment of the invention having a frame, which comprises two tension rods and two end plates, which frame is holding the reactor plates or the flow module plates into place by aid of hydraulic cylinders.

FIG. 7 shows another alternative embodiment of the invention wherein a frame holds the reactor plates 6 or the flow module pates 6 in place. In this figure the plates are kept in place by the force from the grid of springs and the end plates. According to this embodiment of the invention distribution plate 15, and pressure plates 13a and 13b are placed between the two end plates and the reactor plates 6 or the flow module plates 6. Two distance blocks 16 are placed between end plate 7 and distribution plate 15. The distance blocks are in the closed position in this figure, which can be seen in the figure where the distance blocks are placed between the end plate and the distribution plate, which is not the case when the distance blocks are in open position. The forces from hydraulic cylinders 12 can be released so that plates 6 are kept into place without the aid of hydraulic cylinders 12. The force on plates 6 can be measured by measuring the distance between end plate 2 and how far pistons 3 have reached outside end plate 2, see also FIG. 10. The two end plates 2 and 7 are positioned so that the intended number of plates 6 can be entered between them when in open position. The distance between the two end plates may be adjusted by choosing the number of sleeves 17 and tightening of nuts 18 on each tension rod 8.

Figure 8:
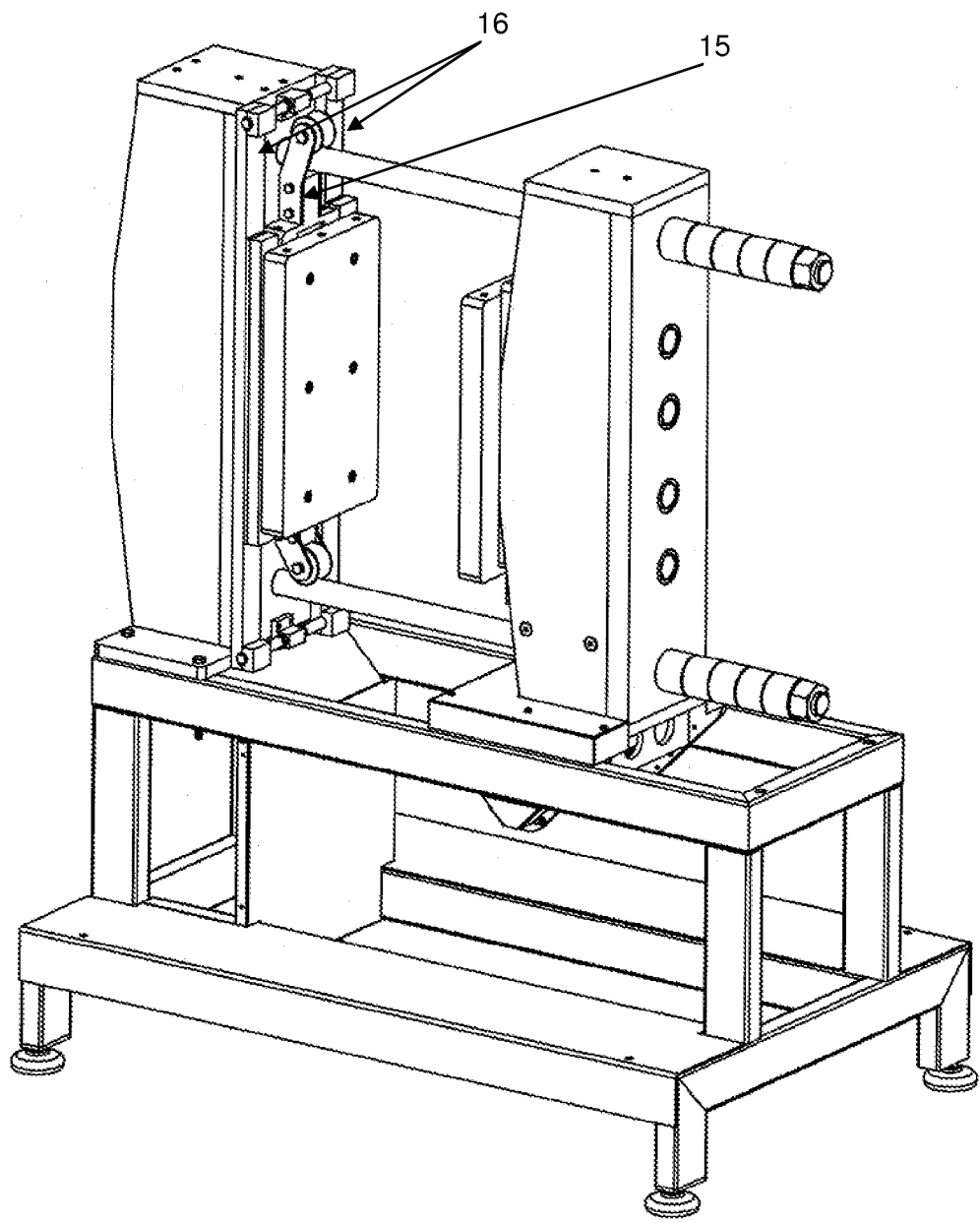
FIG. 8 shows the same embodiment as in FIG. 7, wherein the distance blocks are in the open, or unclamped, position.
Figure 9:
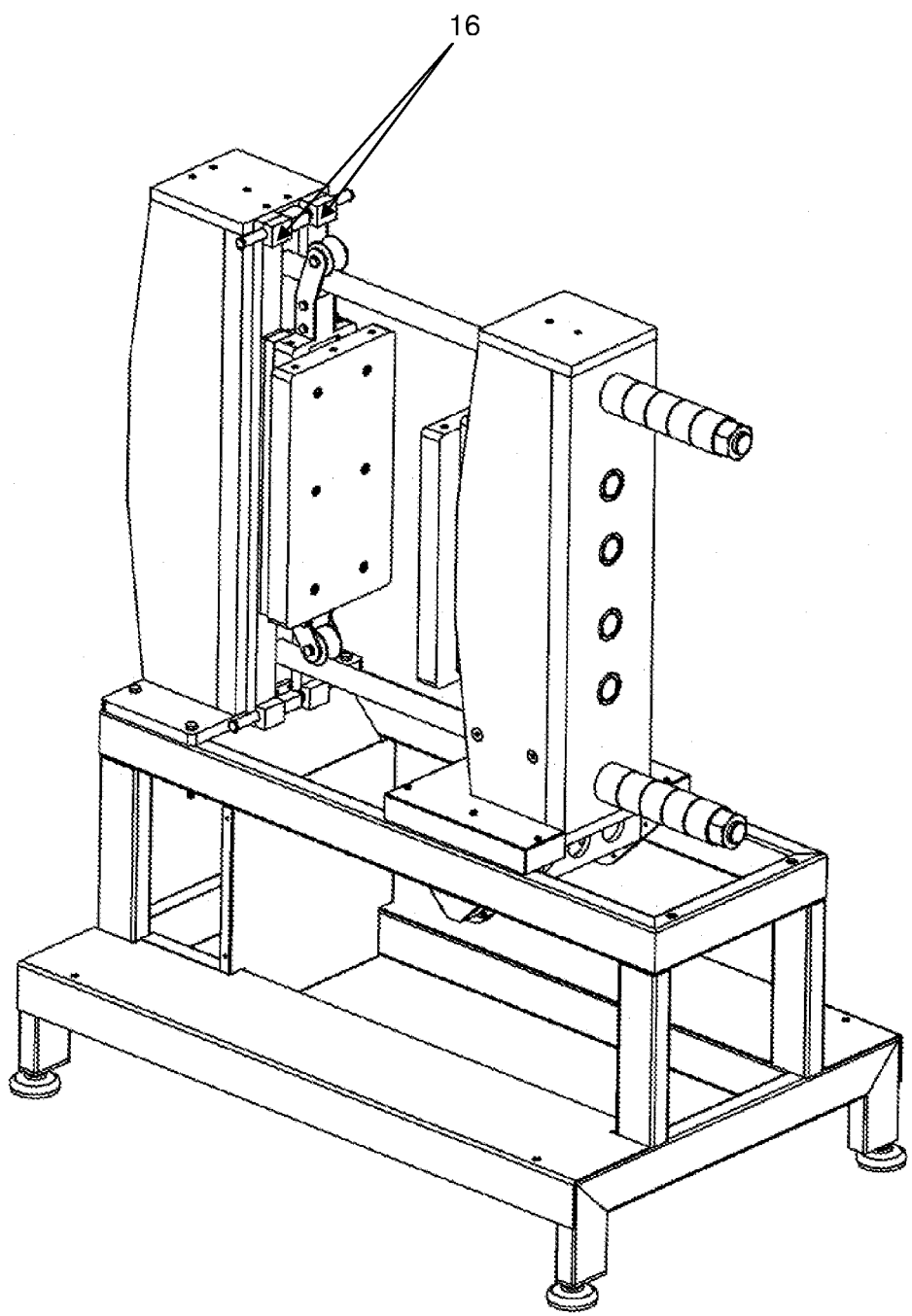
FIG. 9 shows the same view as FIG. 8 of the frame with the distance blocks holding the reactor plates into place in the closed, or clamped position.
Figure 10:
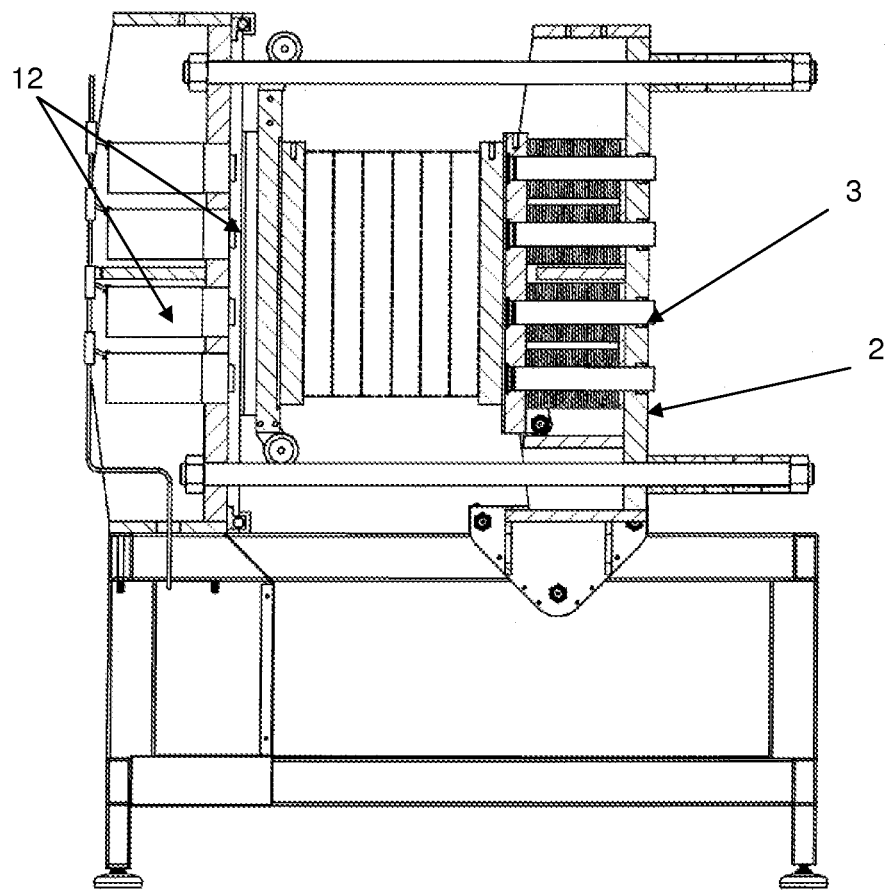
FIG. 10 shows a side view of the same embodiment as in FIG. 7, in which the distance blocks are in the clamped position and the hydraulic cylinders are released.

FIG. 8 shows the distance blocks in open position. The open position is when each block is placed on the outer sides of distribution plate 15. FIG. 9 shows the distance blocks in closed position. When the reactor or the flow module is closed distance blocks 16 are behind distribution plate 15. In FIG. 10 hydraulic cylinders 12 are released from pressure with the distance blocks placed behind the distribution plate holding the reactor or flow module in closed position.

Figure 11:
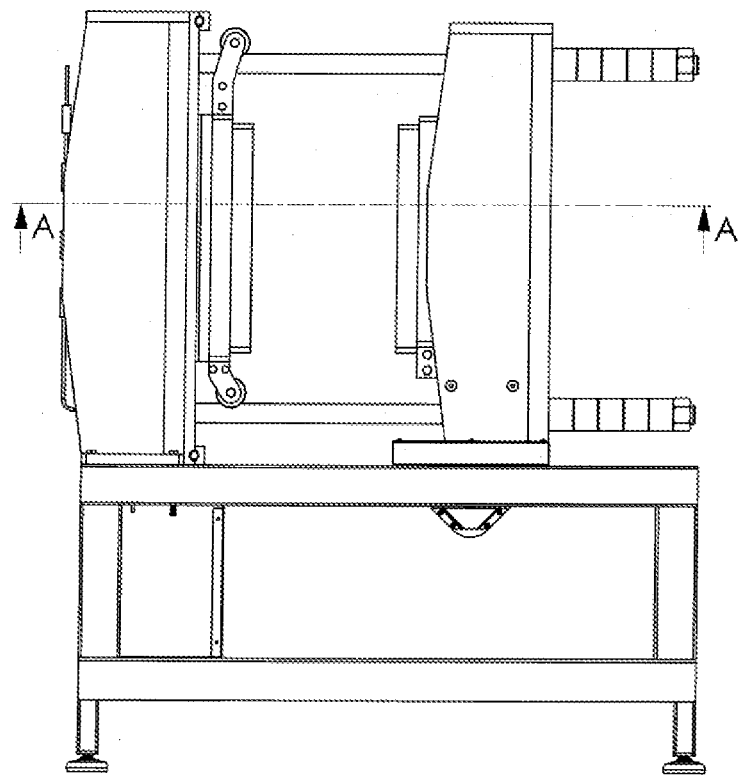
FIG. 11 shows a side view of a closed reactor frame without any clamped plates with a section A-A.
Figure 12:
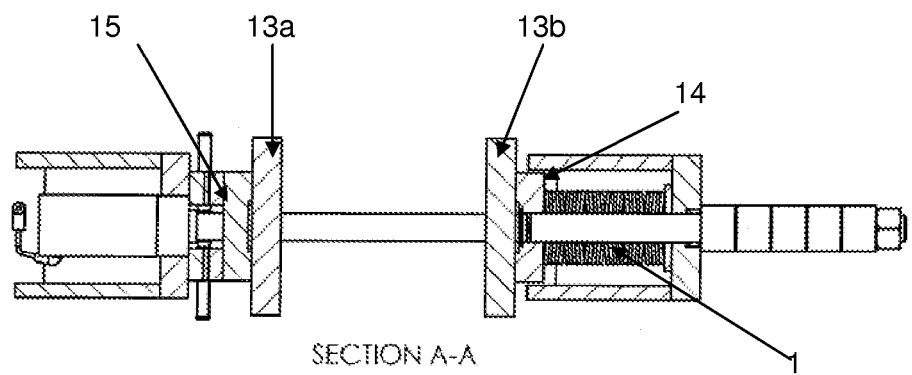
FIG. 12 shows a top view of section A-A.

FIG. 11 shows a side view of the frame with distance blocks in the closed position behind distribution plate 15. The figure shows a cross-section line A-A. In FIG. 12 A-A is a section view of the arrangement from FIG. 11 showing the frame and the grid of springs. FIG. 12 shows how the distribution plate 14 can move inside a housing of the grid of springs depending on the force exerted upon the pressure plate by the hydraulic cylinders. Since there is no reactor plates or no flow module plates in this figure there is no force on the piles of disc springs, which result in that pistons 3 are in level with the outer side of end plate 2. If there are forces from the springs or the hydraulic cylinders the forces are redistributed by means of pressure distribution plates 14 and 15. The redistribution can be done by adding or removing material to define the contact pattern in the interface between the pressure plate and the pressure distribution plate, 13a and 15, 13b and 14 respectively. In this case a vertical groove is milled in the pressure distribution plates in all its length, creating two substantially vertical lines of contact.

EXAMPLE 1

For example a stack of ten reactor plates according to one embodiment has a total dimensional variation of L2−L1=0.6 mm over a temperature range from about −40° C. to about 200° C. By using a grid of tuned spring piles the forces could be held within limits for each pile, which in this case was between F1=12 kN and F2=28 kN, (kN=kilo Newton).

What is claimed is:
1. A clamping device comprising:
two end plates, disc springs, a grid of pistons, and tension rods, each of the two end plates defining a plate area located within a perimeter thereof;
piles of disc springs are arranged as a grid of springs threaded on respective ones of the grid of pistons, the piles of disc springs being distributed and supported over the plate area on one of the two end plates, the grid of springs being positioned inwardly from the tension rods, the grid of springs being positioned to distribute clamping forces on one or more flow module plates, on one or more reactor plates, on one or more heat exchanger plates or on combinations of one or more flow module plates, one or more reactor plates, or on one or more heat exchanger plates, which plates are placed between the two end plates.

2. The clamping device according to claim 1, wherein the wherein each piston of the grid of pistons is moveable independent of each other.

3. The clamping device according to claim 1, wherein the tension rods are arranged along the periphery of the end plates, the tension rods having at least one of fixed length, modular length to set several predefined fixed lengths, the fixed length is at least defining a thickness of one plate, and the fixed length defining total thickness of several plates.

4. The clamping device according to claim 1, wherein the tension rods are at least one of motor driven mechanic jacks, or motor driven roller screws, tension rods tensioned by hydraulic actuators.

5. The clamping device according to claim 1, wherein each piston is locked on an opposite side of the end plate with a washer and a retaining ring.

6. The clamping device according to claim 1, wherein screws are screwing together the tension rods with the two end plates having the grid of springs and the flow module plates, or the reactor plates, or the heat exchanger plates, or combinations thereof arranged between the two end plates.

7. The clamping device according to claim 1, wherein the tensions rods are configured in a first row of tension rods having at least two of the tension rods therein and a second row of tension rods having at least two of the tension rods therein; and the grid of springs being positioned between the first row of tension rods and the second row of tension rods.

8. The clamping device according to claim 1, wherein the tensions rods are configured in a first row of tension rods having at least two of the tension rods therein and a second row of tension rods having at least two of the tension rods therein; and the grid of pistons being positioned between the first row of tension rods and the second row of tension rods.

9. The clamping device according to claim 1, wherein each of the tension rods extends through a respective hole in at least one of the two end plates.

10. The clamping device according to claim 1, wherein each of the pistons extends through a respective hole one of the two end plates.

11. The clamping device according to claim 1, wherein the each of the pistons extends through a respective hole in one of the two the end plates and is locked on an outwardly facing side of the end plate with a washer and a retaining ring;

the washer and the retaining ring are positioned on a portion of the piston that extends through the hole to the outwardly facing side of the end plate; and the washer and the retaining ring are located outwardly from the outwardly facing side of the end plate.

\* \* \* \* \*